United States Patent
Tams et al.

(10) Patent No.: US 6,862,286 B1
(45) Date of Patent: Mar. 1, 2005

(54) TRACKING DYNAMIC ADDRESSES ON A NETWORK

(75) Inventors: Jonathan G G. Tams, Edinburgh (GB); Ronald Brown, Fife (GB); David J Maxwell, Edinburgh (GB); Mark A Pearce, Edinburgh (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/566,563

(22) Filed: May 8, 2000

(51) Int. Cl.⁷ .......................... H04L 12/28; H04L 12/56
(52) U.S. Cl. .............. 370/401; 370/395.32; 370/395.54
(58) Field of Search ................................ 370/252, 395, 370/398, 389, 399, 401, 466, 475; 709/245, 238, 222, 249

(56) References Cited

U.S. PATENT DOCUMENTS

| | | | | |
|---|---|---|---|---|
| 5,835,725 A | * | 11/1998 | Chiang et al. .............. 709/228 |
| 5,922,049 A | * | 7/1999 | Radia et al. ................. 709/220 |
| 5,999,536 A | * | 12/1999 | Kawafuji et al. ........... 370/401 |
| 6,108,782 A | * | 8/2000 | Fletcher et al. ............. 713/153 |
| 6,195,356 B1 | * | 2/2001 | Anello et al. ................ 370/398 |
| 6,216,168 B1 | * | 4/2001 | Dev et al. .................... 709/245 |
| 6,286,039 B1 | * | 9/2001 | Van Horne et al. ......... 709/221 |
| 6,345,051 B1 | * | 2/2002 | Gupta et al. ............. 370/395.2 |
| 6,385,203 B2 | * | 5/2002 | McHale et al. ............. 370/401 |
| 6,532,217 B1 | * | 3/2003 | Alkhatib et al. ............ 370/252 |
| 6,574,240 B1 | * | 6/2003 | Tzeng ......................... 370/469 |
| 6,654,891 B1 | * | 11/2003 | Borsato et al. ............. 713/201 |
| 6,674,756 B1 | * | 1/2004 | Rao et al. ............... 370/395.21 |
| 2003/0208617 A1 | * | 11/2003 | Yanagisawa et al. ....... 709/238 |

OTHER PUBLICATIONS

Swartz et al. (US PUB 2002/0034168) System for digital radio communication between a wireless LAN and a PBX.*
Garrett et al. (USPUB 2002/0023174) service selection in a shared access network using DHCP.*

* cited by examiner

Primary Examiner—Wellington Chin
Assistant Examiner—Mark A Mais
(74) Attorney, Agent, or Firm—Michaelson & Associates; Peter L. Michaelson (57) ABSTRACT

In a computer network of devices, at least some of the devices (i.e. the DCHP devices) have a static (e.g. MAC) address which does not change over time and a dynamic (e.g. IP) address which may change over time. There is disclosed a method and computer program for mapping the static address and dynamic address for the devices comprising polling said devices using said IP addresses and during said polling determining the MAC addresses of the devices, and providing a set of mapped static and dynamic addresses, said method including repeating the steps of the method at intervals.

Using the method of the invention, it is possible, when entering a particular conversation in a database, to access the IP addresses, to determine which is the current DHCP device that address maps to, and assign the conversation to that device and store it in the database assigned to that device. Therefore, for each DHCP device, one can store a history of the conversations or traffic involved in that device.

25 Claims, 6 Drawing Sheets

TRACKING DYNAMIC ADDRESSES ON A NETWORK

BACKGROUND OF THE INVENTION

1. Field of the Invention

The present invention relates to a method and apparatus for tracking dynamic addresses on a network.

2. Description of the Prior Art

The monitoring of computer network usage is very important in modem computer networks, as it allows the network manager to see how the network is performing, and what conversations are taking place in the network. This allows the network manager to perform traffic flow analysis, determine bandwidth requirements, enforce company policies and ensure that the security of the network has not been compromised.

A common technique is to monitor which network addresses are conversing with each other, using a standard such as RMON2 (Remote Network Monitoring version 2, as described in the IETF RFC2021, "Remote Network Monitoring Management Information Base Versions 2 using SMIv2"). This will enable the network manager to see, for example, which IP (Internet Protocol) addresses are in conversation with each other. However, there is a problem with monitoring conversations in this way.

A standard technique for assigning IP addresses to devices is to use an automated system known as DHCP (Dynamic Host Configuration Protocol, as described in the IETF RFC1531, "Dynamic Host configuration Protocol"). In simple terms, when a network uses DHCP, it is not necessary to assign a unique IP address for all times to each device on the network. Instead, one device on the network, known as the DHCP server, controls a pool of IP addresses. When a new device is connected to the network (including the effective "reconnection" that occurs when a device that has been switched off is turned back on again), it contacts the DHCP server, requesting an IP address. In response, the DHCP server allocates one of the unallocated IP addresses in its pool to that device, which the device then keeps until it is removed from the network (or switches off).

This technique has the advantage that it vastly reduces the overheads in configuring new network devices (allowing mobile devices such as laptops to be easily and quickly connected to a network). However, the use of DHCP also introduces the aforementioned network-monitoring problem.

As the IP addresses in the DHCP server's pool are only associated with a particular device for a particular length of time (i.e. until the device is removed from the network, either physically or switched off), one IP address can be associated with different physical devices at different times (we shall consider such an IP address as a dynamic address). Without further information, the network-monitoring system will not know what IP address belongs to which device at what time, and this reduces the value of the information gathered by the network-monitoring system (i.e. the network manager will know which IP addresses were conversing, but not which devices). For security reasons for example, it is desirable to know which physical devices were conversing.

One solution to this problem would be to contact the DHCP server (or servers, in a large network) directly, and request the latest device-to-IP address mappings from their tables. However, there is no current standard for performing this task.

The present invention provides a method to overcome or reduce this problem.

SUMMARY OF THE INVENTION

The present invention provides for or in a network of devices, in which at least some of the devices have a static address which does not change over time and a dynamic address which may change over time, a method of mapping the static address and dynamic address for the devices comprising polling said devices using one of said addresses and during said polling determining the other of said addresses of the device, and providing a set of mapped static and dynamic addresses, said method including repeating the steps of the method at intervals.

Preferably, if when the method is repeated, the relevant addressed have changed, the method includes a step to record such changes.

In a preferred arrangement the device is polled using the dynamic address (which may be an EP address) and during said polling said static address (preferably the MAC address) is determined.

The invention also comprises a computer program on a computer readable medium or embodied in a carrier wave for carrying out the method of the invention.

The present invention also comprises a computer program for use in a computer network of devices, some of which devices have a static address which does not change over time and a dynamic address which may change over time, said program being adapted for mapping the static address and dynamic address of the devices, said computer program comprising:

a program step for polling said devices using one of said addresses;

a program step for determining the other of said addresses of the device during said polling;

a program step for providing a set of mapped static and dynamic addresses; and, a program step for causing repetition of the preceding computer program steps.

Using the method of the invention, therefore, one overcomes or reduces the existing problem that traffic data, for example, a particular conversation, can only be recorded in the database in respect of the relevant IP addresses of the source and destination.

Using the method of the invention, it is generally possible, when entering a particular conversation in the database, to access the IP addresses, to determine what is the current DHCP device that address maps to, and assign the conversation to that device and store it in the database assigned to that device. Therefore, for each DHCP device, one can store a history of the conversations or traffic involved in that device.

BRIEF DESCRIPTION OF THE DRAWINGS

Preferred embodiments of the invention will now be described by way of example only and with reference to the accompanying drawings in which.

DESCRIPTION OF PREFERRED EMBODIMENTS

We will now describe a preferred embodiment of the invention which provides a method whereby a network manager may more efficiently understand how a network is performing and in particular deals with the problem of changes of IP address as devices are added to and removed from the network, or switched on or off.

Figure 5:
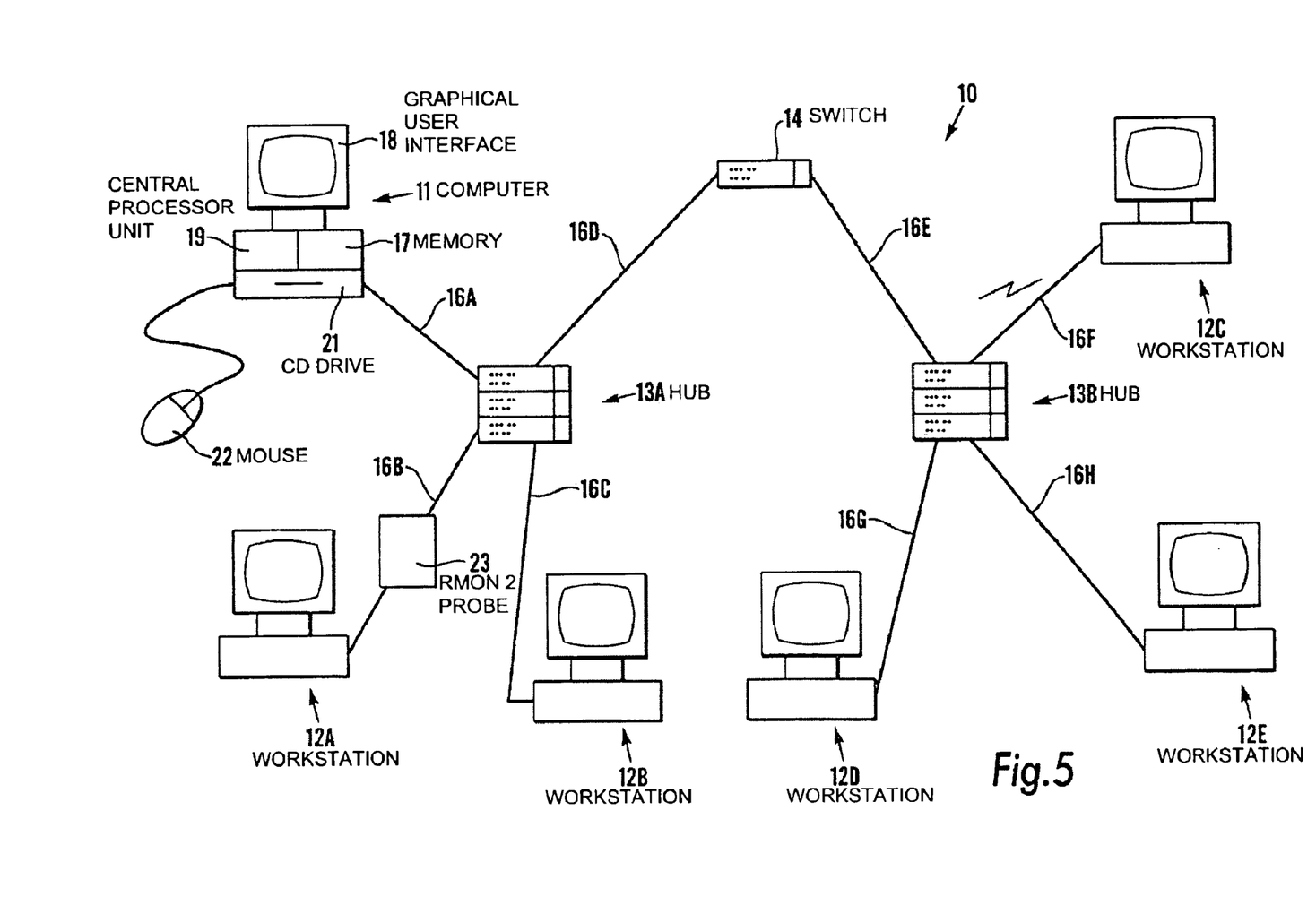
FIG. 5 is a diagram of a computer network.

The method may be applied to a network which comprises, for example, a computer network of the type shown in FIG. 5 which is a schematic. In practice, a network is normally more complex than that illustrated in FIG. 5. The network includes computers, workstations 12A–E, hubs 13A, 13B, routers, switches 14, printers and other devices linked together by physical cable 16A–H or wireless links 16F. The network may be a local area network (LAN), or a wide area network (WAN) or other types and may operate in accordance with any desired protocol. The network will be managed by a network manager who will normally have a dedicated work station or computer 11 which comprises, in addition to a graphical user interface 18, a central processing unit or signal processor 19, a selector which may be in the form of a mouse and/or keyboard to operate the computer, and, may include a CD drive 21, a floppy disk drive or a zip drive. There will also be provided a dedicated memory 17 for storing traffic information in the form of a database which may be managed in accordance with a program provided to the network manager's computer by means, for example, of a CD, a floppy disk, or a zip disk loaded at the network manager's computer. Traffic data will be retrieved from software in, for example, switches that trap information as traffic flows therethrough and stores the information in its MIBs. The data is retrieved by RMON2 probes provided in the network and one of which is illustrated at 23 (RMON2-Remote Network Monitoring described in IETF RFC2021).

This specification describes a method of tracking which IP address is currently assigned to which device by directly contacting those devices known to have received their IP address from a DHCP server, and using the information retrieved from those devices to monitor the mappings between physical devices and IP addresses.

Physical devices (or, at least, so called managed devices) that are connected in a computer network each have a MAC address (Media Access Control address) and, (whilst connected in the network) an IP address. Furthermore, in some cases physical devices (e.g. switches and routers) which have ports for connection to the network may be configured so as to have MAC (and IP) addresses for each port to allow separate identification of that port to allow direction of data to that port. Thus both physical devices and in some cases their ports may have IP and MAC addresses. Through the rest of this specification the expression "physical device" means the actual physical device itself such as a router or switch, and "device" without "physical" includes both (a) the physical devices and (b) those ports of physical devices which have MAC addresses.

For the purposes of network monitoring, those ports of physical devices which include MAC addresses are treated as being different devices.

The MAC address is a unique address used to identify a single device, and is usually "built in" to the device hardware (either by hardwiring or by storing in ROM—read only memory).

The IP (Internet Protocol) Address is an address used to identify a specific device when using the IP communications protocol. The EP Address for a device is controlled by the software running on the network device, and so is not hard-wired.

A device has various attributes associated with it, including the IP Address that the device is using and the MAC Address of the device (if known). A DHCP device is a device that obtains its IP Address from a DHCP server (and so may change this address over time), but which has a constant MAC Address.

Conversation (or trend) data is the data associated with a particular device to represent the conversations it has been having with other devices. Each conversation is associated with two devices, one for each end of the conversation (it is possible for both ends of the conversation to be the same device).

As already described, the network manager requires to know the correspondence at any one time between a device, its current IP address, and a MAC address. The information is obtained by polling selected devices on the network.

In a typical computer network the MAC Address of any Device remains the same, i.e. is static, and the IP Address of any Device that does not use DHCP to obtain its IP Address (a "non-DHCP device") also remains the same i.e. is static, and so can be used to provide a direct mapping to the device in the network-monitoring system. However, the IP Address of any Device that uses DHCP to obtain its IP Address (a "DHCP device") is dynamic (i.e. can change over time by change of the device itself or by switching off the device), and so it is necessary to use the MAC Address of that Device to provide a mapping to the device in the network-monitoring system. The network manager knows the whole pool of IP Addresses that are managed by various DHCP servers, and has supplied this information to the network-monitoring system.

In order to determine the current DHCP information (i.e. what device is using what IP Address), the network-monitoring system must poll each address in the supplied pool of DHCP addresses on a regular basis and retrieve the MAC Address which is currently associated with that IP Address. To achieve this regular polling, a simple technique of polling all the addresses, processing the results and then waiting a predetermined interval of time (e.g. one minute, five minutes, one hour) before re-polling is used.

To retrieve this current DHCP information, the network-monitoring system performs a NetBIOS adapter status (hereafter called NBTSTAT) request for the IP address in question. The resulting information then provides this IP Address/MAC Address mapping.

Such a polling of selected devices provides a correspondence between the device, its IP address, and its MAC address where available, and this is stored in a database which may be used to construct various sets of tables.

IP/Device Mapping Table

The first table is an IP/Device Mapping Table within the network-monitoring application that includes a mapped list of entries, each entry including an IP address and the device to which it maps. In addition to the basic information, this table also holds some basic information about each item on the list, such as whether or not the IP Address relates to a DHCP device, the status of the device, and so on. Clearly as an IP address may be applied to different devices at different points of time the IP/Device mapping needs continually to be updated.

Each row in the IP/Device Address mapping table takes the following format:

| IP Address | Device | Flags |
| --- | --- | --- |

Where:
IP Address is the EP address of the device being represented. All rows must have an EP address value and all values are unique.

Device is the device that the IP address maps to.

Flags are the flags associated with the device. These include flags indicating whether or not the device is a DHCP device and whether or not the device is active.

DHCP Mapping Table

Another table is the DHCP Mapping Table that is used to track DHCP devices as their IP Addresses change, to ensure that the conversation data gathered for a particular IP Address gets associated with the correct device. The table consists of a list of entries, each entry including three components: the device, the MAC Address that maps to the device, and the IP Address that currently maps to the MAC Address. Like the IP/Device Mapping Table, this table also holds basic information about each mapping. An entry from the IP/Device Mapping Table and an entry from the DHCP Mapping Table will be considered to be "equal to each other" if they both contain the same IP Address and both map to the same device. Entries that contain the same IP Address but that map to different devices are not "equal", neither are entries which map to the same device but that contain different IP Addresses.

Each row in the DHCP mapping table takes the following format:

| MAC Address | IP Address | Device | Flags |
|---|---|---|---|

Where:
MAC Address is the MAC address of the DHCP device being represented. All rows must have a MAC address value and all values are unique.

IP Address is the current IP address that is associated with the DHCP device. A row may either have a unique IP address associated with it (in which case it must be ACTIVE—see below), or have no IP address associated with it—the Ø value—see below (in which case it must be INACTIVE—see below).

Device is the device that the MAC address maps to.

Flags are the flags associated with the device. These include flags indicating that the device is a DHCP device and whether or not the device is active Note that all entries in the DHCP mapping table will be flagged as being DHCP—see below.

The symbol Ø (null) in the DHCP Mapping table relating to a particular MAC Address indicates that the entry does not currently map to an IP Address, and so the device is currently inactive.

As noted above, for both the IP/Device and DHCP Mapping Tables, each table entry has some basic information associated with it. This might include whether or not the device is a DHCP device. The flags DHCP will be used to indicate that the device is a DHCP device. Any device which does not have this flag set is considered to be NON-DHCP.

It might also include whether or not the device is active. The flags ACTIVE and INACTIVE will be used to indicate this information. Due to the nature of DHCP devices, it is possible that an IP address in the IP/Device Mapping Table will not currently map to a device, in which case the entry will be considered to be INACTIVE. This may occur when the device to which the IP Address did map was a DHCP device that has now obtained a new IP Address. It is also possible for a DHCP device to become INACTIVE (and then subsequently to become ACTIVE again). This may occur when a new DHCP device is allocated the IP Address that the INACTIVE device was using.

The preferred method of the invention is carried out under the control of the network manager's computer and in particular by means of a computer program controlling the processor of that computer or elsewhere in the system. The program for controlling the operation of the invention may be provided on a computer readable medium, such as a CD, or a floppy disk, or a zip drive disk carrying the program or its equivalent, or may be provided on a computer or a computer memory carrying the website of, for example, the supplier of the network products. The computer program may be downloaded from whichever appropriate source is used to control the processor to carry out the steps of the invention as described. The computer program may comprise the steps shown in the flow charts of FIGS. 1 to 4 and as set out hereafter as algorithms.

DHCP Device Tracking Algorithm

The DHCP Device Tracking Algorithm to carry out the preferred embodiment of the invention works in two parts. Firstly, there is the updating of the IP/Device and DHCP Mapping Tables, ensuring that these carry the latest possible information. Secondly, there is the mapping of IP Addresses to devices that must be performed in order to associate a conversation with the correct devices. Each of these parts is described with reference to the flow diagrams shown in FIGS. 1 to 4. To ease readability, those processes which are indicated by boxes having two vertical margin lines are described separately in other flow charts.

Figure 1:
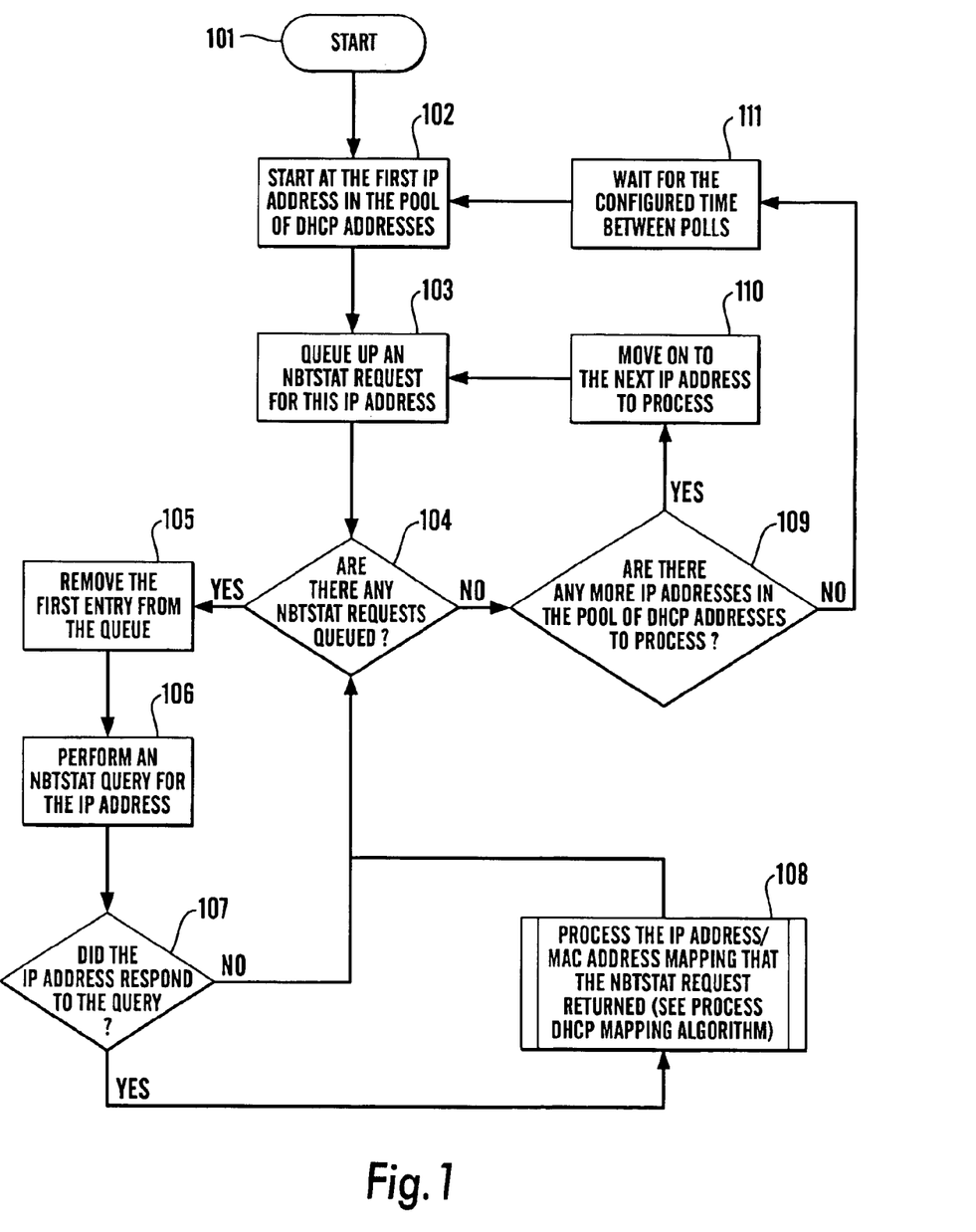
FIGS. 1 to 4 show flow charts of the process.

FIG. 1 shows the first part of the algorithm and relates to a Mapping Table Maintenance Algorithm, and is used to ensure that the IP/Device and DHCP Mapping Tables contain the most up-to-date information possible. Note that this algorithm never terminates —it continually runs, polling the pool of DHCP addresses at regular intervals.

The algorithm comprises the following program steps:— program step 101—start, program step 102—start at the first IP address in the pool of DHCP addresses, program step 103—queue up an NBTSTAT request for this IP address, program step 104—are there any NBTSTAT requests queued?, if yes in step 104, in program step 105 remove the first entry from the queue, program step 106—perform an NBTSTAT query for the UP address, program step 107—did the IP address respond to the query?, if no, return to step 104, if yes, go to step 108, program step 108—process the IP address/MAC address mapping that the NBTSTAT query returned (this process is illustrated in algorithm of FIG. 2), return to step 104, if in step 104 the answer is no, go to step program 109, in program step 109, are there any more IP addresses in the pool of DHCP addresses to process?, if yes, go to program step 110, if no go to program step 111, in program step 110, move on to the next IP address to process and return to program step 103, in program step 111, wait for the predetermined time interval between polls and then return to program step 102.

Figure 2:
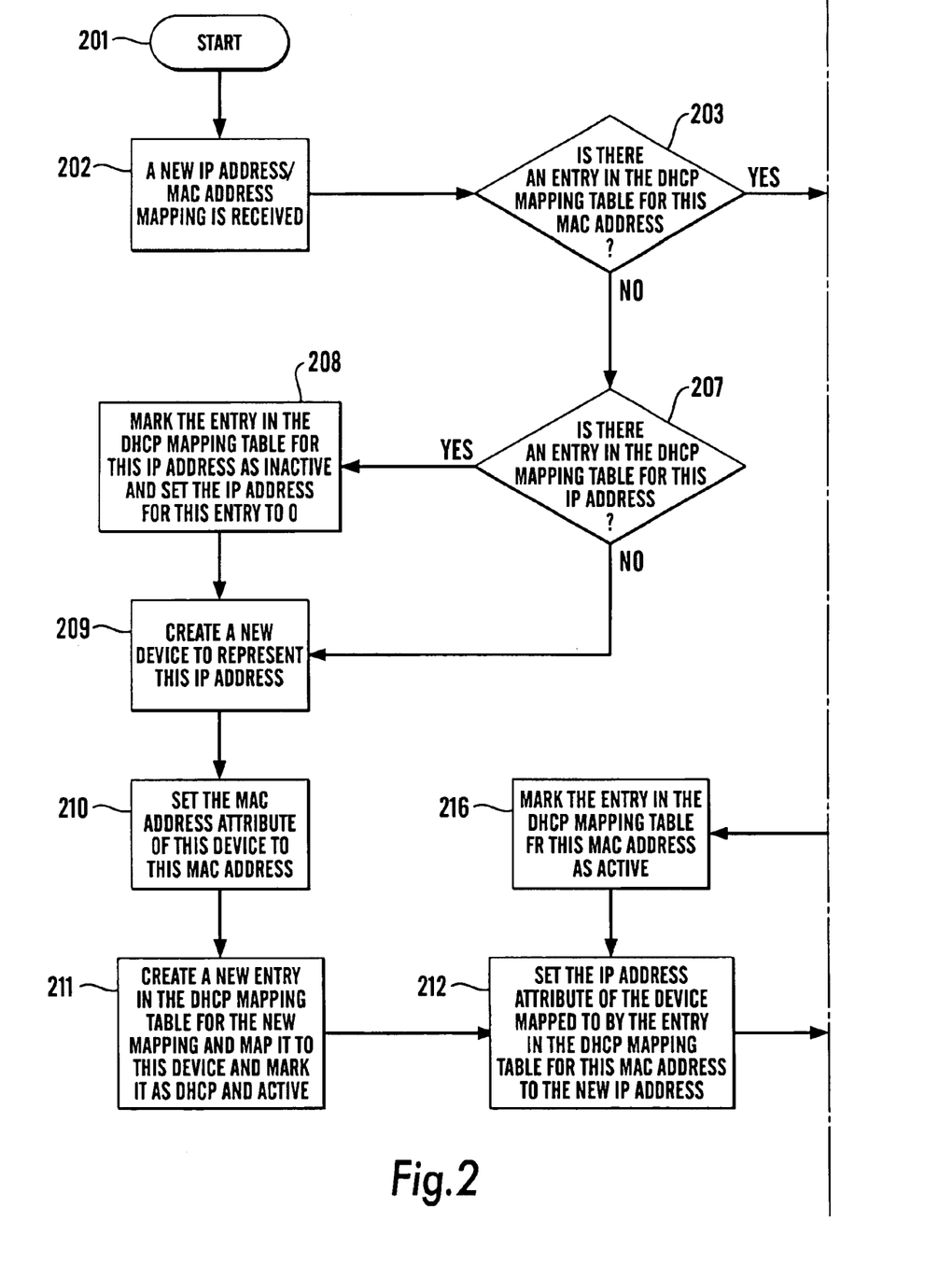

FIG. 2 shows a DHCP Mapping Algorithm which is used to process the new IP Address/MAC Address mapping (also called the DHCP mapping) that is received as a result of a successful NBTSTAT query. Invoking this algorithm updates the IP Address/Device and DHCP Mapping Tables to ensure that they reflect the current state of the DHCP devices in the network.

The algorithm comprises the following program steps:— program step 201—start, program step 202—a new IP address/MAC address mapping is received, program step 203—is there an entry in the DHCP mapping table for this MAC address?, if yes, go to program step 204, program step 204—is there an entry in the DHCP mapping table for this IP address?, if yes, go to program step 205, program step 205—are they the same entry?, if yes, go to program step 206, finish, if in program step 203, answer is no, go to program step 207, program step 207—is there an entry in the DHCP mapping table for this EP address, if yes, go to program step 208, program step 208—mark the entry in the DHCP mapping table for this IP address as INACTIVE and set the EP address for this entry to Ø, program step 209—create a new device to represent this IP address, if answer in program step 207 is no, go to program step 209, program step 210—set the MAC address attribute of this device to this MAC address, program step 211—create a new entry in the DHCP mapping table for the new mapping, and map it to this new device and mark it as DHCP and ACTIVE, program step 212—set the IP address attribute of the device mapped to by the entry in the DHCP mapping table for this MAC address to the new IP address, program step 213—update the IP address/Device Mapping Table to reflect the new mapping (details of this program step set out in FIG. 3), after program step 213, go to program step 206, finish, if answer at program step 204 is no, go to program step 214, program step 214, for the IP address that the entry in the DHCP mapping table for the MAC address currently maps to, mark the corresponding entry in the IP address/Device Mapping Table as INACTIVE, program step 215—change the IP address that the entry in the DHCP mapping table for this MAC address maps to, to be the new IP address, program step 216—mark the entry in the DHCP mapping table for this MAC address as ACTIVE and to go program step 212, if answer at program step 205 is no, go to program step 217, program step 217, mark the entry in the DHCP Mapping table for this IP address as INACTIVE and set the IP address for this entry to Ø, and go to program step 214

Figure 3:
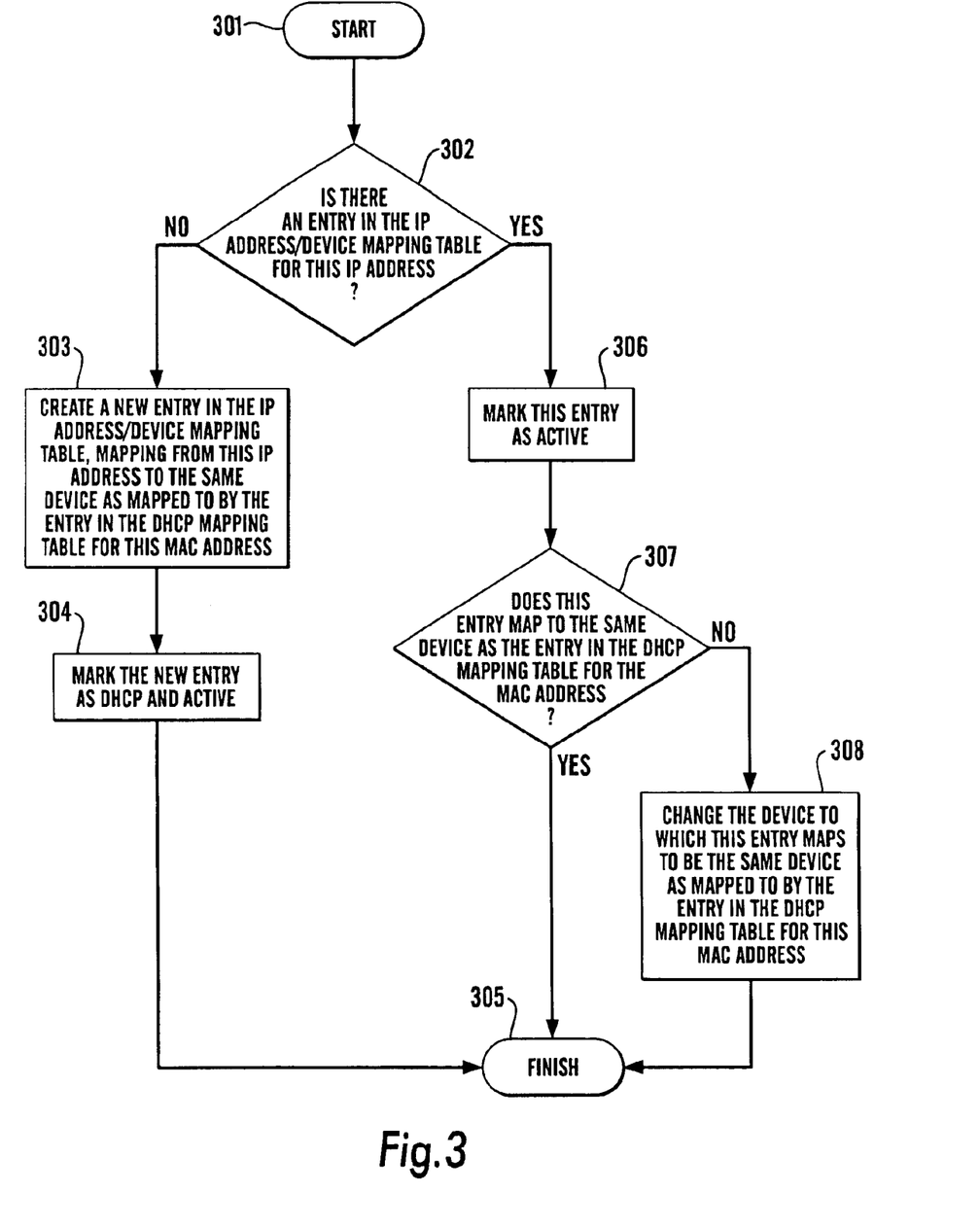

FIG. 3 shows I? Address/Device Mapping Table Update Algorithm which is used to complete the maintenance of the mapping tables. In the previous algorithm (Process DHCP Mapping Algorithm), most of the maintenance is completed, all that remains is to update the EP Address/Device Mapping Table to reflect the new mapping The algorithm comprises the following program steps:— program step 301—start, program step 302, is there an entry in the EP address/Device mapping table for this IP address?, if no, go to program step 303, program step 303—create a new entry in the IP address/Device mapping table, mapping from this IP address to the same device as mapped to by the entry in the DHCP mapping table for this MAC address, program step 304—mark the new entry as DHCP and ACTIVE, go to program step 305, finish, if answer at program step 302 is yes, go to program step 306, program step 306, mark this entry as ACTIVE, program step 307, does this entry map to the same device as the entry in the DHCP mapping table for the MAC address?, if yes, go to program step 305, finish, if no, go to program step 308, program step 308, change the device to which this entry maps to be the same device as mapped to by the entry in the DHCP mapping table for this MAC address.

Figure 4:
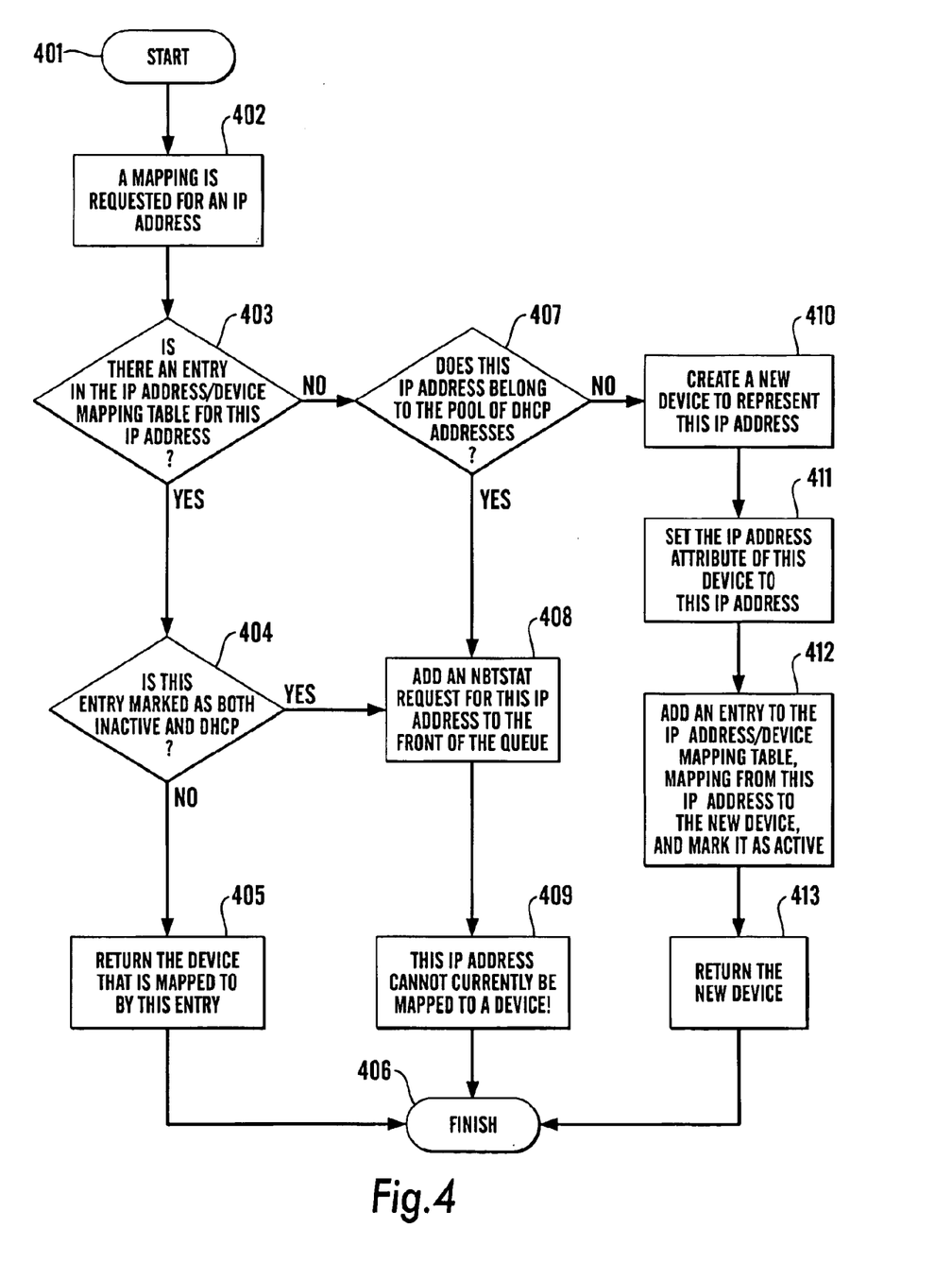

FIG. 4 shows the second part of the algorithm, and is used to map the IP Addresses associated with a particular conversation to the correct devices. Note that this part of the algorithm may not succeed in performing this mapping if the DHCP address being mapped does not map to a device yet. In such a case, the algorithm will request that this address be looked up as soon as possible to try and avoid such a situation again.

The algorithm comprises the following program steps:— program step 401—start, program step 402—a mapping is requested for an EP address, program step 403—is there an entry in the IP address/Device mapping table for this IP address?, if yes, go to program step 404, program step 404—is this entry marked as both INACTIVE and DHCP, if no, go to program step 405, program step 405—return the device that is mapped to by this entry, go to program step 406, finish, if answer at program step 404 is yes, go to program step 408, if the answer at program step 403 is no, go to program step 407, program step 407—does this IP address belong to the pool of DHCP addresses?, if yes, go to program step 408, program step 408—add an NBTSTAT request for this IP address to the front of the queue, program step 409, this IP address cannot currently be mapped to a device, go to program step 406, finish, if answer at program step 407 is no, go to program step 410, program step 410—create a new device to represent this IP address, program step 411—set the IP address attribute of this device to this IP address, program step 412—add an entry to the IP address/Device mapping table, mapping from this IP address to the new device and mark it as ACTIVE, program step 413—return the new device, go to program step 406, finish.

EXAMPLES

We will now set out a set of examples of the steps that are performed to maintain the DHCP and IP Address mapping tables as devices (including non-DHCP devices) are added to and DHCP devices are removed from the network.

Note that the method makes no distinction between a static DHCP device being powered-up and a mobile DHCP device being connected to the network, nor does it make any distinction between a static DHCP device being removed from the network and a mobile DHCP device being disconnected from the network. As a result, the examples will only refer to devices being either "added" or "removed", although it should be inferred that any of the above cases are being discussed.

The examples assume that there is a network consisting of both non-DHCP devices and DHCP devices. The non-DHCP devices are called N1, N2, N3 and N4 and have the corresponding IP addresses IP1, IP2, IP3 and IP4. The DHCP devices are called D1, D2, D3 and D4 and have the corresponding MAC addresses M1, M2, M3 and M4. The DHCP server has a pool of IP addresses consisting of IP5, IP6, IP7 and IP8. Note that when the algorithm starts, the devices N1–N4 and D1–D4 are not yet created in the topology of the network management system.

Note that throughout these examples, the tables are ordered by the first column. This is not necessary for implementing of the algorithm, but is done to ease readability.

Empty Tables

We start with both tables being empty, before any DHCP devices have been polled or to any conversation data retrieved (which would trigger the use of the IP Address to Device Mapping Algorithm):

| DHCP Mapping Table | | | |
|---|---|---|---|
| MAC Address | IP Address | Device | Flags |

| IP Address Mapping Table | | |
|---|---|---|
| IP Address | Device | Flags |

Initial DHCP Poll

The system makes an initial poll of the DHCP addresses in the network, and discovers that on polling IP address IP5, it is associated with MAC address M1, and so it performs the following steps:

It examines the DHCP mapping table and notes that there is no entry for this MAC address, nor is there an entry for this IP address.

It therefore creates a new device, D1, to represent this DHCP device and sets the attributes of the device appropriately.

It then creates an entry in the DHCP mapping table for this new IP address/MAC address/device mapping, and marks it as DHCP and ACTIVE.

It examines the IP address mapping table and notes that there is no entry for this IP address.

It therefore creates a new entry in the IP address mapping table for this IP address/device mapping, and marks it as DHCP and ACTIVE.

Having completed these steps, the tables now look like this:

| DHCP Mapping Table | | | |
|---|---|---|---|
| MAC Address | IP Address | Device | Flags |
| M1 | IP5 | D1 | DHCP, ACTIVE |

| IP Address Mapping Table | | |
|---|---|---|
| IP Address | Device | Flags |
| IP5 | D1 | DHCP, ACTIVE |

Similarly, on polling IP address IP6, it discovers that IP6 is associated with MAC address M2. It then goes through the following (identical except in the device that gets created) steps:

It examines the DHCP mapping table and notes that there is no entry for this MAC address, nor is there an entry for this IP address.

It therefore creates a new device, D2, to represent this DHCP device and sets the attributes of the device appropriately.

It then creates an entry in the DHCP mapping table for this new IP address/MAC address/device mapping, and marks it as DHCP and ACTIVE.

It examines the IP address mapping table and notes that there is no entry for this EP address.

It therefore creates a new entry in the EP address mapping table for this IP address/device mapping, and marks it as DHCP and ACTIVE.

Having completed these steps, the tables now look like this:

| DHCP Mapping Table | | | |
|---|---|---|---|
| MAC Address | IP Address | Device | Flags |
| M1 | IP5 | D1 | DHCP, ACTIVE |
| M2 | IP6 | D2 | DHCP, ACTIVE |

| IP Address Mapping Table | | |
|---|---|---|
| IP Address | Device | Flags |
| IP5 | D1 | DHCP, ACTIVE |
| IP6 | D2 | DHCP, ACTIVE |

On polling IP addresses IP7 and IP8, the system receives no response, and so has no actions to perform. On completing this poll, the system then waits until the next poll is due.

Initial Conversation Retrieval

Let us assume that the system now retrieves some conversation data from an RMON2 probe. This conversation data (which is stored with the source IP address and destination EP address for the relevant conversation) contains only conversations between the following pairs of IP addresses:

| Source IP Address | Destination IP Address |
|---|---|
| IP1 | IP2 |
| IP3 | IP5 |
| IP6 | IP7 |

In processing these conversations the IP Address to Device Mapping Algorithm will be invoked to determine which pair of devices each conversation should be associated with.

Invoking it for EP address IP1 causes the system to perform the following steps:

It examines the IP address mapping table and notes that there is no entry for this IP address.

It also notes that this IP address is not in the range of DHCP addresses.

It therefore creates a new device, N1, to represent this IP address and sets the attributes of the device appropriately.

It then creates a new entry in the IP address mapping table for this IP address/device mapping, and marks it as ACTIVE.

Finally it returns this new device.

Similarly for IP address IP2, invoking the algorithm causes the system to perform the following steps:

It examines the IP address mapping table and notes that there is no entry for this IP address.

It also notes that this IP address is not in the range of DHCP addresses.

It therefore creates a new device, N2, to represent this IP address and sets the attributes of the device appropriately.

It then creates a new entry in the IP address mapping table for this IP address/device mapping, and marks it as ACTIVE.

Finally it returns this new device.

Similarly for IP address IP3, invoking the algorithm causes the system to perform the following steps:

It examines the IP address mapping table and notes that there is no entry for this IP address.

It also notes that this IP address is not in the range of DHCP addresses.

It therefore creates a new device, N3, to represent this IP address and sets the attributes of the device appropriately.

It then creates a new entry in the IP address mapping table for this IP address/device mapping, and marks it as ACTIVE.

Finally it returns this new device.

For IP address IP5, invoking the algorithm causes the system to perform the following steps:

It examines the IP address mapping table and notes that there is an entry for this IP address.

It examines the flags of this entry and notes that it is not marked as both INACTIVE and DHCP.

It therefore returns D1, the device that this entry maps to.

Similarly for IP address EP6, invoking the algorithm causes the system to perform the following steps:

It examines the IP address mapping table and notes that there is an entry for this IP address.

It examines the flags of this entry and notes that it is not marked as both INACTIVE and DHCP.

It therefore returns D2, the device that this entry maps to.

Finally, for IP address IP7, invoking the algorithm causes the system to perform the following steps:

It examines the IP address mapping table and notes that there is no entry for this IP address.

It also notes that this IP address is in the range of DHCP addresses.

It therefore adds a request for an NBTSTAT lookup on this address, and the IP address cannot currently be mapped to a device.

Having completed these steps, the tables now look like this:

| DHCP Mapping Table | | | |
|---|---|---|---|
| MAC Address | IP Address | Device | Flags |
| M1 | IP5 | D1 | DHCP, ACTIVE |
| M2 | IP6 | D2 | DHCP, ACTIVE |

| IP Address Mapping Table | | |
|---|---|---|
| IP Address | Device | Flags |
| IP1 | N1 | ACTIVE |
| IP2 | N2 | ACTIVE |
| IP3 | N3 | ACTIVE |
| IP5 | D1 | DHCP, ACTIVE |
| IP6 | D2 | DHCP, ACTIVE |

DRCP Device is Removed

On the next poll of the DHCP addresses, the system only receives a response from IP address IP5, which still maps to MAC address M1. It does not receive a response from IP6.

As a result of the response from IP address IP5, the system performs the following steps:

It examines the DHCP mapping table and notes that there are entries for both this MAC address and this IP address.

It examines the entries and sees that they are both the same and so has nothing further to do.

Therefore the tables remain unchanged.

The lack of a response from IP6 causes no change to the tables either.

One might ask why a DHCP device is not marked as INACTIVE when there is no response from its IP address during an NBTSTAT poll?

The reason is that the system wants to associate any incoming conversation data with that DHCP device until it knows that the IP address has been reassigned to a new DHCP device. There are two parts to this:

As the retrieval of conversation data is interleaved with the NBTSTAT polling, the system may find that a DHCP device has been disconnected from the network before the system has retrieved the last of its conversations from the probe. If the system were to mark the device as inactive, then it would not be able to associate the retrieved conversations for this EP address with the correct device and data would be lost.

The lack of response may be due to a temporary fault in the network. Until the system knows otherwise it is safer to assume that the DHCP device is still active.

DHCP Device is Added

On the next poll of the DHCP addresses, the system receives responses from IP address IP5, which still maps to MAC address M1, IP address IP6, which is responding again and still maps to MAC address M2, and IP address IP7, which maps to MAC address M3.

As a result of the response from IP address IP5, the system performs the following steps:

It examines the DHCP mapping table and notes that there are entries for both this MAC address and this IP address.

It examines the entries and sees that they are both the same and so has nothing further to do.

Therefore the tables remain unchanged.

As a result of the response from IP address IP6, the system performs the following steps:

It examines the DHCP mapping table and notes that there are entries for both this MAC address and this IP address.

It examines the entries and sees that they are both the same and so has nothing further to do.

Therefore the tables remain unchanged.

As a result of the response from IP address IP7, the system performs the following steps:

It examines the DHCP mapping table and notes that there is no entry for this MAC address, nor is there an entry for this IP address.

It therefore creates a new device, D3, to represent this DHCP device and sets the attributes of the device appropriately.

It then creates an entry in the DHCP mapping table for this new IP address/MAC address/device mapping, and marks it as DHCP and ACTIVE.

It examines the IP address mapping table and notes that there is no entry for this IP address.

It therefore creates a new entry in the IP address mapping table for this IP address/device mapping, and marks it as DHCP and ACTIVE.

Having completed these steps, the tables now look like this:

| DHCP Mapping Table | | | |
|---|---|---|---|
| MAC Address | IP Address | Device | Flags |
| M1 | IP5 | D1 | DHCP, ACTIVE |
| M2 | IP6 | D2 | DHCP, ACTIVE |
| M3 | IP7 | D3 | DHCP, ACTIVE |

| IP Address Mapping Table | | |
|---|---|---|
| IP Address | Device | Flags |
| IP1 | N1 | ACTIVE |
| IP2 | N2 | ACTIVE |
| IP3 | N3 | ACTIVE |
| IP5 | D1 | DHCP, ACTIVE |
| IP6 | D2 | DHCP, ACTIVE |
| IP7 | D3 | DHCP, ACTIVE |

Non-DHCP Device is Added

The system now retrieves some conversation data from an RMON2 probe. Among the conversations, there is a conversation that involves the IP address IP4. During the processing of this conversation the IP Address to Device Mapping Algorithm is invoked to determine which device IP4 maps to. This causes the system to perform the following steps:

It examines the IP address mapping table and notes that there is no entry for this IP address.

It also notes that this IP address is not in the range of DHCP addresses.

It therefore creates a new device, N4, to represent this IP address and sets the attributes of the device appropriately.

It then creates a new entry in the IP address mapping table for this IP address/device mapping, and marks it as ACTIVE.

Finally it returns this new device.

Having completed these steps, the tables now look like this:

| DHCP Mapping Table | | | |
|---|---|---|---|
| MAC Address | IP Address | Device | Flags |
| M1 | IP5 | D1 | DHCP, ACTIVE |
| M2 | IP6 | D2 | DHCP, ACTIVE |
| M3 | IP7 | D3 | DHCP, ACTIVE |

| IP Address Mapping Table | | |
|---|---|---|
| IP Address | Device | Flags |
| IP1 | N1 | ACTIVE |
| IP2 | N2 | ACTIVE |
| IP3 | N3 | ACTIVE |
| IP4 | N4 | ACTIVE |
| IP5 | D1 | DHCP, ACTIVE |
| IP6 | D2 | DHCP, ACTIVE |
| IP7 | D3 | DHCP, ACTIVE |

DHCP Device is Added Reusing an IP Address

On the next poll of the DHCP addresses, the system receives responses from IP address IP5, which still maps to MAC address M1, IP address IP6, which is responding again and still maps to MAC address M2, and IP address IP7, which now maps to MAC address M4.

As a result of the response from IP address IP5, the system performs the following steps:

It examines the DHCP mapping table and notes that there are entries for both this MAC address and this IP address.

It examines the entries and sees that they are both the same and so has nothing further to do.

Therefore the tables remain unchanged.

As a result of the response from IP address IP6, the system performs the following steps:

It examines the DHCP mapping table and notes that there are entries for both this MAC address and this IP address.

It examines the entries and sees that they are both the same and so has nothing further to do.

Therefore the tables remain unchanged.

As a result of the response from IP address IP7, the system performs the following steps:

It examines the DHCP mapping table and notes that there is no entry for this MAC address, but there is an entry for the IP address.

It therefore marks the entry in the DHCP mapping table for the IP address as being INACTIVE, and sets its IP address to Ø.

It then creates a new device, D4, to represent this DHCP device and sets the attributes of the device appropriately.

It then creates an entry in the DHCP mapping table for this new IP address/MAC address/device mapping, and marks it as DHCP and ACTIVE.

It examines the IP address mapping table and notes that there is an entry for this IP address.

It then examines the entry and notes that it maps to a different device from the device mapped to by the DHCP mapping table entry.

It therefore changes the device to which entry maps to be the same as the device mapped by the DHCP mapping table entry.

Having completed these steps, the tables now look like this:

| DHCP Mapping Table | | | |
|---|---|---|---|
| MAC Address | IP Address | Device | Flags |
| M1 | IP5 | D1 | DHCP, ACTIVE |
| M2 | IP6 | D2 | DHCP, ACTIVE |
| M3 | @ | D3 | DHCP, INACTIVE |
| M4 | IP7 | D4 | DHCP, ACTIVE |

| IP Address Mapping Table | | |
|---|---|---|
| IP Address | Device | Flags |
| IP1 | N1 | ACTIVE |
| IP2 | N2 | ACTIVE |
| IP3 | N3 | ACTIVE |
| IP4 | N4 | ACTIVE |
| IP5 | D1 | DHCP, ACTIVE |
| IP6 | D2 | DHCP, ACTIVE |
| IP7 | D4 | DHCP, ACTIVE |

Active DHCP Device Changes IP Address

On the next poll of the DHCP addresses, the system receives responses from IP address IP5, which still maps to MAC address M1, IP address IP7, which still maps to MAC address M4, and IP address IP8, which maps to MAC address M2. Note that this effectively means that the device D2 has had a new IP address (IP8) assigned to it.

As a result of the response from IP address IP5, the system performs the following steps:

It examines the DHCP mapping table and notes that there are entries for both this MAC address and this IP address.

It examines the entries and sees that they are both the same and so has nothing further to do.

Therefore the tables remain unchanged.

As a result of the response from IP address IP7, the system performs the following steps:

It examines the DHCP mapping table and notes that there are entries for both this MAC address and this IP address.

It examines the entries and sees that they are both the same and so has nothing further to do.

Therefore the tables remain unchanged.

As a result of the response from IP address IP8, the system performs the following steps:

It examines the DHCP mapping table and notes that there is an entry for this MAC address, but no entry for this IP address.

It therefore determines the IP address that the entry in the DHCP mapping table for this MAC address currently maps to. It then locates the entry for that IP address in the IP address mapping table, and marks it as INACTIVE.

It then changes the IP address to which the entry in the DHCP mapping table for this MAC address currently maps to so that it is the new IP address, IP8, and marks this entry as ACTIVE.

It then updates the IP address attribute of the device, D2, so that it is set to this new IP address, IP8.

It examines the IP address mapping table and notes that there is no entry for this IP address.

It therefore creates a new entry in the IP address mapping table for this IP address/device mapping, and marks it as DHCP and ACTIVE.

Having completed these steps, the tables now look like this:

| DHCP Mapping Table | | | |
|---|---|---|---|
| MAC Address | IP Address | Device | Flags |
| M1 | IP5 | D1 | DHCP, ACTIVE |
| M2 | IP8 | D2 | DHCP, ACTIVE |
| M3 | @ | D3 | DHCP, INACTIVE |
| M4 | IP7 | D4 | DHCP, ACTIVE |

| IP Address Mapping Table | | |
|---|---|---|
| IP Address | Device | Flags |
| IP1 | N1 | ACTIVE |
| IP2 | N2 | ACTIVE |
| IP3 | N3 | ACTIVE |
| IP4 | N4 | ACTIVE |
| IP5 | D1 | DHCP, ACTIVE |
| IP6 | D2 | DHCP, INACTIVE |
| IP7 | D4 | DHCP, ACTIVE |
| IP8 | D2 | DHCP, ACTIVE |

Active DHCP Device "Steals" IP Address

On the next poll of the DHCP addresses, the system receives a response from IP address IP5 only, which now maps to MAC address M2.

As a result of the response from IP address IP5, the system performs the following steps:

It examines the DHCP mapping table and notes that there are entries for both the MAC address and the IP address.

It examines the entries and sees that they are different entries.

It therefore marks the entry in the DHCP mapping table for this IP address as INACTIVE, and sets its IP address to Ø.

It then determines the IP address that the entry in the DHCP mapping table for this MAC address currently maps to. It then locates the entry for that IP address in the IP address mapping table, and marks it as INACTIVE.

It then changes the IP address to which the entry in the DHCP mapping table for this MAC address currently maps to so that it is the new IP address, IP8, and marks this entry as ACTIVE.

It then updates the IP address attribute of the device, D2, so that it is set to this new IP address, IP8.

It examines the IP address mapping table and notes that there is an entry for this IP address. It therefore marks the entry as ACTIVE.

It then examines the entry and notes that it maps to a different device to the device mapped to by the DHCP mapping table entry.

It therefore changes the device to which entry maps to be the same as the device mapped to by the DHCP mapping table entry.

Having completed these steps, the tables now look like this:

| DHCP Mapping Table | | | |
|---|---|---|---|
| MAC Address | IP Address | Device | Flags |
| M1 | @ | D1 | DHCP, INACTIVE |
| M2 | IP5 | D2 | DHCP, ACTIVE |
| M3 | @ | D3 | DHCP, INACTIVE |
| M4 | IP7 | D4 | DHCP, ACTIVE |

| IP Address Mapping Table | | |
|---|---|---|
| IP Address | Device | Flags |
| IP1 | N1 | ACTIVE |
| IP2 | N2 | ACTIVE |
| IP3 | N3 | ACTIVE |
| IP4 | N4 | ACTIVE |
| IP5 | D2 | DHCP, ACTIVE |
| IP6 | D2 | DHCP, INACTIVE |
| IP7 | D4 | DHCP, ACTIVE |
| IP8 | D2 | DHCP, INACTIVE |

It will be noted that the EP address mapping table now has multiple entries which all map to D2 (IP5, IP6 and IP8). Note however that only one of these entries is marked as ACTIVE. This is acceptable as:

The algorithm ensures that in the case of multiple entries in the IP address mapping table mapping to a single device, only one of the entries is marked as Active.

The use of the IP address mapping table by the IP address to device mapping Algorithm ignores any but the currently active entry where multiple entries are mapped to the same device.

The invention is not restricted to the details of the foregoing examples.

What is claimed is:

1. For or in a network of devices, in which at least some of the devices have a static address which does not change over time and a dynamic address which may change over time, a method of mapping the static address and dynamic address for the devices comprising polling said devices using one of said addresses and during said polling determining the other of said addresses of the device, and providing a set of mapped static and dynamic addresses, said set of mapped static and dynamic addresses including, for at least some of said mapped addresses, further information including whether said device is ACTIVE or INACTIVE, said method including repeating the steps of the method at intervals.

2. A method as claimed in claim 1 in which, if, when the steps of the method are repeated, the relevant addresses have changed, said changes of address are recorded.

3. A method as claimed in claim 1 in which each of said devices is polled using said dynamic address and during said polling determining said static address.

4. A method as claimed in claim 3 in which only those devices having a dynamic address which may change are polled.

5. A method as claimed in claim 4 in which said static address is a MAC address and said dynamic address is an IP address.

6. A method as claimed in claim 5 in which the devices which are to be polled are determined from a list of DHCP addresses.

7. A method as claimed in claim 5 including the step of using said mapped MAC and IP addresses to produce an IP/Device Mapping Table in which the correspondence of each IP address and relevant device is mapped and said table includes, in addition to the IP address, the MAC address, for each device, an indication of whether said device is ACTIVE or INACTIVE.

8. A method as claimed in claim 7 in which said table includes, in addition to the IP address and the device, for each device, an indication of whether said device is a DHCP device or a non-DHCP device.

9. A method as claimed in claim 5 including the step of using said mapped MAC and IP addresses to produce a DHCP Mapping Table in which the correspondence of each IP address, MAC address and relevant DHCP device is mapped.

10. A computer program on a computer readable medium for carrying out the method of claim 1.

11. A computer program embodied in a carrier wave for carrying out the method of claim 1.

12. A computer program for use in a computer network of devices, some of which devices have a static address which does not change over time and a dynamic address which may change over time, said program being adapted for mapping the static address and dynamic address of the devices, said computer program comprising:
 a program step for polling said devices using one of said addresses;
 a program step for determining the other of said addresses of the device during said polling;
 a program step for determining, for at least some of said mapped addresses, whether said relevant device is ACTIVE or INACTIVE,
 a program step for providing a set of mapped static and dynamic addresses and whether said relevant device is ACTIVE or INACTIVE; and,
 a program step for causing repetition of the preceding computer program steps.

13. A computer for use in a network of devices, some of which devices have a static address which does not change over time and a dynamic address which may change over time, said program being adapted for mapping the static address and dynamic address of the devices, said computer comprising a central processing unit, a graphical user interface, a selector to operate the computer, a program store, and a memory, said program store including a computer program comprising:
 a program step for polling said devices using one of said addresses;
 a program step for determining the other of said addresses of the device during said polling;
 a program step for determining, for at least some of said mapped addresses, whether said relevant device is ACTIVE or INACTIVE,
 a program step for providing a set of mapped static and dynamic addresses and information whether said relevant device is ACTIVE or INACTIVE; and
 a program step for causing repetition of the preceding computer program steps.

14. A computer network of devices, some of which devices have a static address which does not change over time and a dynamic address which may change over time, said program being adapted for mapping the static address and dynamic address of the devices, said network including a computer comprising a central processing unit, a graphical user interface, a selector to operate the computer, a program store, and a memory, said program store including a computer program comprising:

a program step for polling said devices using one of said addresses;

a program step for determining the other of said addresses of the device during said polling;

a program step for determining, for at least some of said mapped addresses, whether said relevant device is ACTIVE or INACTIVE, a program step for providing a set of mapped static and dynamic addresses and whether said relevant device is ACTIVE or INACTIVE, and a program step for causing repetition of the preceding computer program steps.

15. A computer program on a computer readable medium comprising the following steps:

program step 102—start at a first IP address in a pool of DHCP addresses, program step 103—queue up an NBTSTAT request for this IP address, program step 104—determine whether there are any NBTSTAT requests queued, if said program step 104 determines that there are any NBTSTAT requests queued, in program step 105 remove the first entry from the queue, program step 106—perform an NBTSTAT query for the IP address, program step 107—determine whether the IP address responded to the query, if said program step 107 determines that the IP address did not respond to the query, return to said program step 104, if said program step 107 determines that the IP address did respond to the query, go to program step 108, said program step 108—process the IP address/MAC address mapping that the NBTSTAT query returned, and return to said program step 104, if said program step 104 determines that there are no NBTSTAT requests queued, go to program step program 109, in said program step 109, determine whether there are any more IP addresses in the pool of DHCP addresses to process, if said program step 109 determines that there are more IP addresses in the pool of DHCP addresses to process, go to program step 110, otherwise go to program step 111, in said program step 110, move on to the next IP address to process and return to said program step 103, in said program step 111, wait for a predetermined time interval between polls and then return to said program step 102.

16. A computer program as claimed in claim 15 in which said program step 108 comprises:

program step 202—a new IP address/MAC address mapping is received, program step 203—determine whether there is an entry in the DHCP mapping table for this MAC address, if said program step 203 determines that there is an entry in the DHCP mapping table for the MAC address, go to program step 204, said program step 204—determine whether there is an entry in the DHCP mapping table for this IP address, if said program step 204 determines that there is an entry in the DHCP mapping table for this IP address, go to program step 205, said program step 205—determine whether the entry is for this IP address, if said program step 205 determines that the entry is for this IP address, go to program step 206, finish, if in said program step 203 determines that there is not an entry in the DHCP mapping table for the MAC address, go to program step 207, said program step 207—determines whether there is an entry in the DHCP mapping table for this IP address, if said program step 207 determines that there is an entry in the DHCP mapping table for this IP address, go to program step 208, said program step 208—mark the entry in the DHCP mapping table for this IP address as INACTIVE and set the IP address for this entry to Ø, program step 209—create a new device to represent this IP address, if said program step 207 determines that there is not an entry in the DHCP mapping table for this IP address, go to program step 209, program step 210—set the MAC address attribute of this device to this MAC address, program step 211—create a new entry in the DHCP mapping table for the new mapping, and map it to this new device and mark it as DHCP and ACTIVE, program step 212—set the IP address attribute of the device mapped to by the entry in the DHCP mapping table for this MAC address to the new IP address, program step 213—update the IP address/Device Mapping Table to reflect the new mapping, after said program step 213, go to said program step 206, finish, if said program step 204 determines that that there is an entry in the DHCP mapping table for this IP address, go to program step 214, said program step 214, for the IP address that the entry in the DHCP mapping table for the MAC address currently maps to, mark the corresponding entry in the IP address/Device Mapping Table as INACTIVE, program step 215—change the IP address that the entry in the DHCP mapping table for this MAC address maps to, to be the new IP address, program step 216—mark the entry in the DHCP mapping table for this MAC address as ACTIVE and to go program step 212, if said program step 205 determines that the entry is not for this IP address go to program step-217, said program step 217, mark the entry in the DHCP Mapping table for this IP address as INACTIVE and set the IP address for this entry to Ø, and go to program step 214.

17. A computer program as claimed in claim 16 in which said program step 213 comprises:

program step 302, determine whether there is an entry in the IP address/Device mapping table for this IP address, if said program step 302 determines that there is not an entry in the IP address/Device mapping table for this IP address, go to program step 303, said program step 303—create a new entry in the IP address/Device mapping table, mapping from this IP address to the same device as mapped to by the entry in the DHCP mapping table for this MAC address, program step 304—mark the new entry as DHCP and ACTIVE, and go to program step 305, finish, if said program step 302 determines that there is an entry in the IP address/Device mapping table for this IP address, go to program step 306, said program step 306, mark this entry as ACTIVE, program step 307, determine whether this entry maps to the same device as the entry in the DHCP mapping table for the MAC address, if said program step 307 determines that the entry maps to the same device as the entry in the DHCP mapping table, go to said program step 305, finish, if said program step 307 determines that the entry does not map to the same device as the entry in the DHCP mapping table, go to program step 308, said program step 308, change the device to which this entry maps to be the same device as mapped to by the entry in the DHCP mapping table for this MAC address.

18. A computer program as claimed in claim 17 including:

program step 402—a mapping is requested for an IP address, program step 403—determine whether there is an entry in the IP address/Device mapping table for this IP address, if said program step 403 determines that there is an entry in the IP address/Device mapping table for this IP address, go to program step 404, said program step 404—determine whether this entry marked as both INACTIVE and DHCP, if said program step 404 determines that this entry is not marked as both INACTIVE and DHCP, go to program step 405, said program step 405—return the device that is mapped to by this entry, and go to program step 406, finish, if said program step 404 determines that this entry is marked as both INACTIVE and DHCP, go to program step 408, if said program step 403 determines that there is not an entry in the IP address/Device mapping table for this IP address, go to program step 407, said program step 407—determine whether this IP address belongs to the pool of DHCP addresses, if said program step 407 determines that this IP address belongs to the pool of DHCP addresses, go to said program step 408, said program step 408—add an NBTSTAT request for this IP address to the front of the queue, program step 409, this IP address cannot currently be mapped to a device, go to said program step 406, if said program step 407 determines that this IP address does not belong to the pool of DHCP addresses, go to program step 410, said program step 410—create a new device to represent this IP address, program step 411—set the IP address attribute of this device to this IP address, program step 412—add an entry to the IP address/Device mapping table, mapping from this IP address to the new device and mark it as ACTIVE, program step 413—return the new device, go to said program step 406.

19. For or in a network of devices, in which at least some of the devices have a static address which does not change over time and a dynamic address which may change over time, a method of mapping the static address and dynamic address for the devices comprising polling said devices using one of said addresses and during said polling determining the other of said addresses of the device, and providing a set of mapped static and dynamic addresses, said set of mapped static and dynamic addresses including, for at least some of said mapped addresses, an indication of whether the relevant device is a DHCP device or a non-DHCP device, said method including repeating the steps of the method at intervals.

20. For or in a network of devices, in which at least some of the devices have a MAC address which does not change over time and an IP address which may change over time, a method of mapping the MAC address and IP address for the devices comprising polling said devices using said IP address and during said polling determining the MAC address of the device, and providing a set of mapped MAC and IP addresses, said method including repeating the steps of the method at intervals, and when the steps of the method are repeated, if the relevant addresses have changed, said changes of address are recorded, and using said mapped MAC and IP addresses to produce a DHCP Mapping Table in which the correspondence of each IP address, MAC address and relevant DHCP device is mapped.

21. A computer program on a computer readable medium for carrying out the method of claim 19.

22. A computer program embodied in a carrier wave for carrying out the method of claim 19.

23. A computer program for use in a computer network of devices, some of which devices have a static address which does not change over time and a dynamic address which may change over time, said program being adapted for mapping the static address and dynamic address of the devices, said computer program comprising:

a program step for polling said devices using one of said addresses;

a program step for determining the other of said addresses of the device during said polling;

a program step for providing a set of mapped static and dynamic addresses;

a program step for providing for at least some of said mapped addresses an indication of whether said device is a DHCP device or a non-DHCP device, and, a program step for causing repetition of the preceding computer program steps.

24. A computer for use in a network of devices, some of which devices have a static address which does not change over time and a dynamic address which may change over time, said program being adapted for mapping the static address and dynamic address of the devices, said, computer comprising a central processing unit, a graphical user interface, a selector to operate the computer, a program store, and a memory, said program store including a computer program comprising:

a program step for polling said devices using one of said addresses;

a program step for determining the other of said addresses of the device during said polling;

a program step for providing a set of mapped static and dynamic addresses;

a program step for providing for at least some of said mapped addresses an indication of whether said device is a DHCP device or a non-DHCP device, and a program step for causing repetition of the preceding computer program steps.

25. A computer network of devices, some of which devices have a static address which does not change over time and a dynamic address which may change over time, said program being adapted for mapping the static address and dynamic address of the devices, said network including a computer comprising a central processing unit, a graphical user interface, a selector to operate the computer, a program store, and a memory, said program store including a computer program comprising:

a program step for polling said devices using one of said addresses;

a program step for determining the other of said addresses of the device during said polling;

a program step for providing a set of mapped static and dynamic addresses;

a program step for providing for at least some of said mapped addresses an indication of whether said device is a DHCP device of a non-DHCP device, and, a program step for causing repetition of the preceding computer program steps.

* * * * *